United States Patent [19]

Berney

[11] Patent Number: 4,800,334

[45] Date of Patent: Jan. 24, 1989

[54] METHOD OF ANALYZING THE VOLTAGE INDUCED IN AN EXCITER COIL OF A STEPPING MOTOR

[75] Inventor: Jean-Claude Berney, Epalinges, Switzerland

[73] Assignee: U.S. Philips Corp., New York, N.Y.

[21] Appl. No.: 900,861

[22] Filed: Aug. 27, 1986

Related U.S. Application Data

[63] Continuation-in-part of Ser. No. 516,021, Jul. 22, 1983, abandoned.

[30] Foreign Application Priority Data

Aug. 4, 1982 [NL] Netherlands .......................... 8203094

[51] Int. Cl.[4] .......................... G01R 31/02; G04F 5/00; G06F 1/04
[52] U.S. Cl. .......................... 324/158 MG; 318/696; 368/157; 377/28; 377/50
[58] Field of Search .......................... 324/158 MG, 133; 340/661, 662, 663; 318/696; 368/86, 157, 200; 377/50, 28

[56] References Cited

U.S. PATENT DOCUMENTS

| 3,742,351 | 6/1973 | Palmer et al. | 324/133 |
| 4,346,463 | 8/1982 | Tu Xuan et al. | 368/157 |
| 4,460,282 | 7/1984 | Kanno | 318/696 |
| 4,467,255 | 8/1984 | Tu Xuan | 318/696 |

FOREIGN PATENT DOCUMENTS 1210441 9/1958 France ............................... 324/133

OTHER PUBLICATIONS

Berney, J.; Societe Suisse de Chronometrie; 56th Congress; Neuchatel; Oct. 23&24, 1981; Communication No. 27; Bulletin pp. 185–188.

Ohtawa et al.; Societe Suisse de Chronometrie; 56th Congress; Neuchatel; Oct. 23&24, 1981; Communication No. 11; Bulletin pp.79–84.

Primary Examiner—Ernest F. Karlsen
Attorney, Agent, or Firm—Bernard Franzblau

[57] ABSTRACT

A method of analyzing the voltage induced in an exciter coil of a stepping motor. After energization the exciter coil is loaded by a low impedance so that the induction voltage can produce a current. Subsequently, it is attempted to maintain the current through said coil equal to zero by periodically connecting said coil to a positive or negative voltage. The pattern of consecutive polarities of these periodic energizations is analyzed.

36 Claims, 4 Drawing Sheets

METHOD OF ANALYZING THE VOLTAGE INDUCED IN AN EXCITER COIL OF A STEPPING MOTOR

This is a continuation-in-part application of application Ser. No. 516,021, filed July 22, 1983, now abandoned.

The invention relates to a method of analysing the voltage induced in an exciter coil of a stepping motor in detection periods which occur after energization. The invention also relates to a circuit for carrying out the method. Stepping motors are, inter alia, employed in watches. For this purpose it is important that the motor behaviour can be measured, for example, in order to minimize the power consumption of the stepping motor.

The article "Méthode particulière d'alimentation d'un moteur pas-à-pas de type Lavet" by Jean-Claude Berney, Société Suisse de Chronométrie, 56th Congres, Neuchatel, Oct. 23 and 24, 1981, communication no. 27, Bulletin pages 185-188, describes a method of driving the stepping motor with a constant current pulse Io by periodically measuring the motor current during said pulse and, depending on whether the motor current is larger or smaller than the reference value Io, short-circuiting the motor or connecting the motor to the battery, so that the motor receives voltage pulses of variable duration during the current pulse in order to maintain the current constant. As a result of the self-inductance of the exciter coil of the motor the motor current is then substantially constant during the energizing pulse.

This article describes how the sum of the voltage across the internal resistance of the motor, which voltage is constant as a result of the current control, and the induction voltage can be derived from the relative time interval in which the motor is connected to the battery. The self-inductance of the motor then is not a factor as a result of the constant-current control. By analysing the variation of this induction voltage it is then possible to obtain various data as regards the motor behaviour. For example, it is possible to determine the instant at which the motor has made a step and subsequently the current pulse may be interrupted in order to limit the power consumption.

Another known method is the "Adaptive Controlled Drive System" of Daini Seikosha Co. Ltd., which system has been described, inter alia during the aforementioned Congress, Communication No. 11, Bulletin pages 79-84. This method analyzes the induction voltage after each energizing pulse in order to detect whether the motor has made a step in response to this energizing pulse. If no step has been made a correction pulse is applied and the energy content of the succeeding energizing pulses is increased, and at the same time the energy content is reduced periodically in order to ensure that the motor is driven with a minimal dissipation.

It is an object of the invention to provide a method of analysing the voltage induced in an exciter coil of a stepping motor in detection periods which occur after the energizing pulses, which method almost exclusively employs logic means for the analysis of the induction voltage and minimizes the power consumption, and to provide a circuit for carrying out this method.

To this end the method according to the invention is characterized in that in said detection periods the exciter coil is loaded by a low impedance so that the induction voltage can produce an induction current. The polarity of the current in the exciter coil is detected at periodic instants during said detection period, and in accordance with the detected polarity the exciter coil is energized with a voltage of such a polarity that the instantaneous current in the exciter coil is counteracted. The pattern of consecutive energizations during said detection periods is analysed.

When this method is used the self-inductance of said coil is "charged" or "discharged" by means of positive and negative current pulses respectively as a result of the voltage drive and it is achieved that—if possible—the current in the coil (the "charge" of the self-inductance) was maintained substantially equal to zero.

It is found that the pattern of positive and negative energizations is representative of the variation of the induction voltage so that, after conversion of this pattern into a sequence of binary units, the induction voltage can be analysed by purely logic means.

It is advantageous that during the detection periods the exciter coil be energized with a periodic pattern of voltage pulses of constant duration, whose polarity is controlled as a function of the detected polarity of the current in the exciter coil.

In accordance with this characteristic feature only positive and negative pulses are applied without modulation of the width of these pulses so that this signal can be converted into a logic signal in a simple manner.

As regards the analysis of the pattern of consecutive energizations the method in accordance with the invention may further be characterized in that the ratio of the number of voltage pulses of one polarity to the number of voltage pulses of the other polarity over a specific period is determined.

This method in accordance with the invention may further be characterized in that the voltage pulses have a specific duration which is a fraction of the length of the period at which they recur.

This leads to an increased sensitivity to small induction voltages. However, as a result of this the detection becomes "saturated" when the absolute value of the induction voltage becomes greater than the same fraction of the voltage of said voltage pulses.

This "saturation" effect can be utilized. For this purpose the method in accordance with the invention may be further characterized in that it is detected a series of more than a predetermined number of consecutive pulses of the same polarity occur.

When said series are sufficiently long they correspond to the periods in which said "saturations" occur. Said series consequently correspond to the periods in which the absolute value of the induction voltage is greater than said fraction of the voltage of the voltage pulses, so that it is detected whether the induction voltage has exceeded a specific level. This may be utilized in order to detect whether the stepping motor has made a step. For this, the method in accordance with the invention may further be characterized in that it is detected whether a second series of at least a first predetermined number of consecutive pulses of a polarity which, relative to the exciter coil, is opposite to the polarity of the voltage across the exciter coil during energization occurs after a first series of at least a second predetermined number of consecutive pulses of an opposite polarity has occurred.

In this way a reliable indication is obtained as to whether the stepping motor has performed a step, which indication is found to be highly independent of the make of the motor.

This last-mentioned method may be further characterized in that each detection period is terminated at least a predetermined time interval after the detection of the first period.

A circuit for carrying out the method may be characterized in that the circuit comprises a comparator for determining the polarity of the current in the exciter coil of the stepping motor, a command-signal generator for generating a signal in conformity with the detected polarity of said current, a commutation circuit for connecting the exciter coil of the stepping motor to a voltage source under command of said signal in such a way that the polarity of the resulting current variation in the exciter coil is opposite to the polarity determined by the comparator, and a logic gate circuit for analysing the consecutive polarities of said current variations.

This circuit may further be characterized in that the logic gate circuit receives said signal as an input signal.

This circuit may further be characterized in that the logic gate circuit comprises counting means for detecting whether at least a first number of consecutive signals corresponding to a first polarity of said current, which first polarity is opposite to the polarity of the current in the exciter coil during the preceding drive, occurs after a second number of consecutive signals corresponding to a second polarity, opposite to the first polarity, has occurred.

In addition it is an object of the invention to provide a method of the type mentioned in the opening paragraph which makes it possible to detect whether the motor has made a step in a manner which is highly independent of the motor parameters and to provide a circuit for carrying out this method. To this end the method is characterized in that, for establishing whether the stepping motor has made a step as a result of said energization, it is detected whether the induction voltage has been more negative than a predetermined extent for at least a second period of predetermined duration after said induction voltage has been more positive than a predetermined extent for at least a first period of predetermined duration.

The method may further be characterized in that in said detection periods the exciter coil is loaded by a low impedance so that the induction voltage can produce an induction current and the polarity of the current in the exciter coil is detected at periodic instants during said detection periods. In accordance with the detected polarity the exciter coil is energized with a voltage of such a polarity that the instantaneous current in the exciter coil is counteracted, and the polarity pattern of consecutive energizations during said detection periods is analysed.

The circuit for carrying out the method may be characterized in that the circuit comprises comparison means for comparing the induction voltage with the voltage of a voltage source and a detection circuit for detecting whether the induction voltage has been negative to more than a predetermined extent for at least the second period of predetermined duration after said induction voltage has been positive to more than a predetermined extent for at least the first period of predetermined duration.

This circuit may further be characterized in that the comparison means comprise a comparator for determining the polarity of the current in the exciter coil of the stepping motor, a command signal generator for generating a signal in conformity with the detected polarity of said current, a commutation circuit for connecting the exciter coil of the stepping motor to the voltage source under command of said signal in such a way that the polarity of the resulting current variation in the exciter coil is opposite to the polarity determined by the comparator, and the detection circuit is a logic gate circuit for analysing the consecutive polarities of said current variations.

The invention will now be described in more detail, by way of example, with reference to the drawings, in which.

Figure 1:
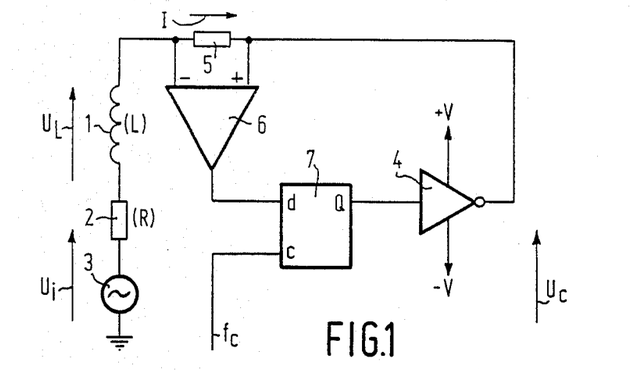
FIG. 1 shows the basic diagram of a circuit for carrying out a method in accordance with the invention.

FIG. 1 shows the basic diagram of an induction-voltage detection circuit in which the method in accordance with the invention can be performed. The operating principle is to maintain the current in the motor at a value equal to zero. In FIG. 1 the motor is represented by the self-inductance 1 of value L, the resistor 2 of value R and a voltage source 3 supplying an induction voltage $U_i$. The motor is connected to the output of a power amplifier 4 via a resistor 5 of comparatively low resistance. The resistor 5 is arranged between the inputs of a comparator 6 which supplies a logic signal which is a function of the polarity of the voltage across the resistor 5 and, consequently, is a function of the polarity of the current I through the resistor 5 and the motor. The output of the comparator 6 is connected to the input d of a flip-flop 7, whose clock input c receives a signal $f_c$ having a frequency of a few kHz. The output Q of the flip-flop 7 is connected to the input of the power amplifier 4 which can supply either a positive voltage $+V$ or a negative voltage $-V$ to the motor.

When the current I in the motor flows in the direction indicated by the arrow in FIG. 1 the output of comparator 6 is low, which is hereinafter referred to as "0". The output Q of flip-flop 7 then goes to "0" when the next clock signal occurs and the output of amplifier 4 goes to $+V$. As a result of this, the current I is counteracted and tends to reverse. When the current I reverses the output of comparator 6 goes high, which is referred to hereinafter as "1". When the next clock pulse occurs the output Q of flip-flop 7 also goes to "1" and the output of amplifier 4 to $-V$. The motor current than again tends to reverse. In this way it is attempted to maintain the motor current I equal to zero whenever possible by applying voltage pulses. As a result of the self-inductance, which is comparatively high in the motors used in watches, the variations of the current about the value zero are comparatively small. The voltage at the output of amplifier 4 is a signal comprising a number $n^+$ of periods in which the voltage is equal to $+V$ and a number $n^-$ of periods during which the voltage is $-V$. The length $\Delta t$ of these periods is defined by the clock signal $f_c$. As the motor current is maintained substantially equal to zero the voltage drop across the internal resistance R may be ignored.

The voltage $U_c$ on the output of amplifier 4 complies with:

$$U_c + U_i + U_L = U_i + L\frac{\Delta I}{\Delta t}$$

where $\Delta I$ is the variation of the current I during the period $\Delta t$.

The variation of I during the period that $U_c = +V$, which is designated $\Delta I^+$, is then:

$$\Delta I^+ = (V - U_i)\frac{\Delta t}{\alpha}$$

The variation of I during the period that $U_c = -V$, which is designated $\Delta I^-$, is then:

$$\Delta I^- = (-V - U_i)\frac{\Delta t}{\alpha}$$

As the current I is maintained at substantially zero the total current variation over several periods $\Delta t$ is zero, or:

$$\Sigma \Delta I^+ + \Sigma \Delta I^- = 0$$

As the number of periods $\Delta I^+$ is equal to $n^+$ and the number of periods $\Delta I^-$ is $n^-$, it can be found by means of the expressions for $\Delta I^+$ and $\Delta I^-$ that:

$$U_i = \frac{n^+ - n^-}{n^+ + n^-} V$$

This means that the induction voltage $U_i$ is equal to the average voltage on the output of amplifier 4.

Since the output signal of flip-flop 7 is a logic signal whose number of "1"'s is equal to the parameter $n^-$ and whose number of "0"'s is equal to the parameter $n^+$, this logic signal is representative of the induction voltage $U_i$ so that it is possible to analyse this induction voltage $U_i$ by logic means.

The parameter $$\frac{n^+ - n^-}{n^+ + n^-}$$

represents the ratio of the induction voltage $U_i$ to the supply voltage V. As $U_i$ may become comparatively small, this parameter may also become small and the definition of the system may deteriorate. Therefore, in order to increase this definition, the voltage applied to the motor may be reduced. This can be achieved very simply by applying the voltages $+V$ and $-V$ only for a fraction $1/P$ of the period $\Delta t$. The expression for the induction voltage $U_i$ then becomes:

$$U_i = \frac{V}{P} \cdot \frac{n^+ - n^-}{n^+ + n^-}$$

FIGS. 2a to 6a show the waveforms of the logic signal on the output of flip-flop 7 for various typical situations and FIGS. 2b to 6b show the corresponding wave forms of the induction voltage. The parameter P has been selected to equal 8, so that the system becomes saturated (the factor $$\frac{n^+ - n^-}{n^+ + n^-}$$

is maximum or a minimum and the output of flip-flop 7 is constantly "0" or "1") when the induction voltage $U_i$ exceeds the value $+V/8$ or $-V/8$. In Figures a these ranges are designated "+" ($U_i$ positive) and "−" ($U_i$ negative), while the intermediate ranges, where the output of flip-flop 7 changes between 1 and 0 and the induction voltage $U_i$ has a value between $+V/8$ and $-V/8$, are represented by vertical hatching.

Figure 2:
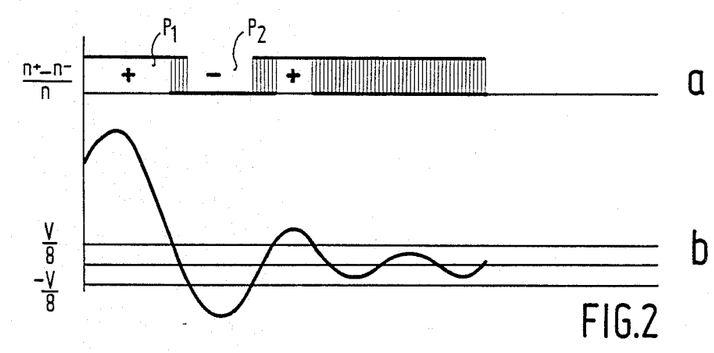
FIGS. 2-6 show five possible situations, Figures a each showing a commutation signal and Figures b the corresponding variation of an induction voltage.

In the situation shown in FIG. 2 the rotor has already made a step at the end of a drive pulse, which is not shown and which precedes the period in which the signals shown in FIGS. 2b–6b occur. The rotor passes the new point of equilibrium ($U_i$ positive), subsequently returns to this new point of equilibrium ($U_i$ negative) and oscillates about this point of equilibrium. The logic signal (FIG. 2a) comprises a "+" period (P1) followed by a "−" period (P2) and an intermediate period where the logic signal alternates between "0" and "1".

Figure 3:
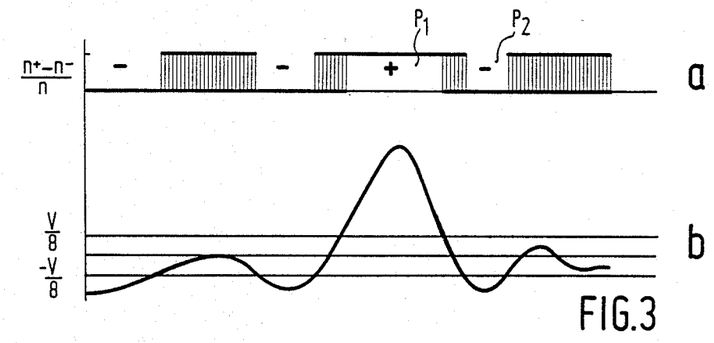

In the situation shown in FIG. 3 the rotor has not yet completed its step at the end of the drive pulse but is about to complete it. The rotor completes its step ($U_i$ negative), oscillates past the new point of equilibrium ($U_i$ positive) and returns to this new point of equilibrium ($U_i$ negative). Again a "−" period P2 appears after a "+" period P1.

Figure 4:
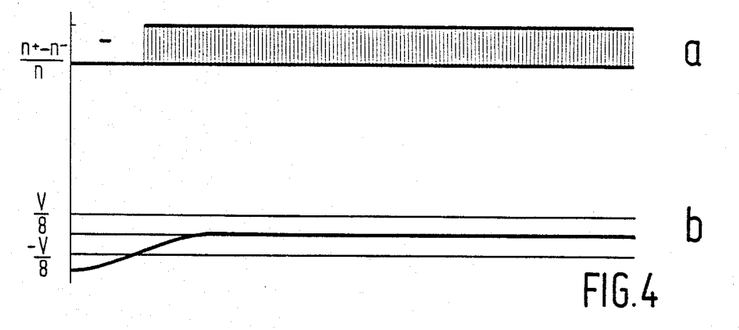
Figure 5:
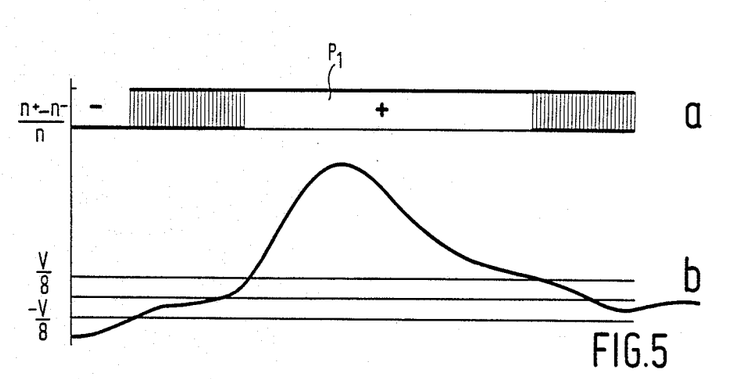
Figure 6:
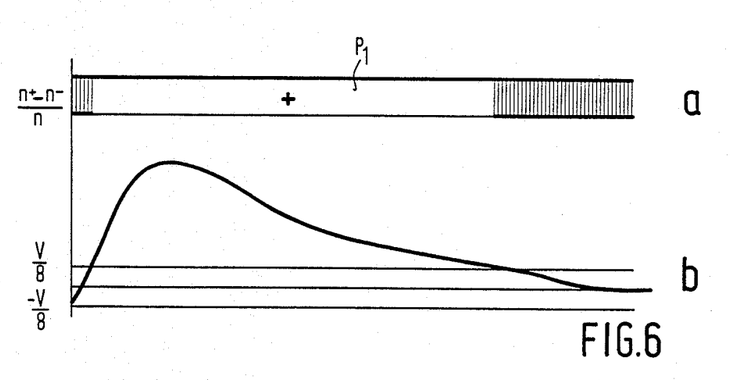

In the situations shown in FIGS. 4 to 6 the rotor does not make a step. In FIG. 4 the rotor remains blocked in an intermediate position, in the situation shown in FIG. 5 the rotor returns after initially being blocked at an intermediate position, and in the situation shown in FIG. 6 the rotor immediately returns to the original position. If the rotor remains in the blocked position (FIG. 4) there is neither a positive (returning to the old position or advancing to a new position) period nor a subsequent negative period (returning to a new position after overshooting), and if the rotor returns to the old position (FIGS. 5 and 6) there is a positive period but not a negative period. Therefore, it may be assumed that the rotor has made one step when this signal exhibits a negative period P2 after a positive period P1.

Figure 7:
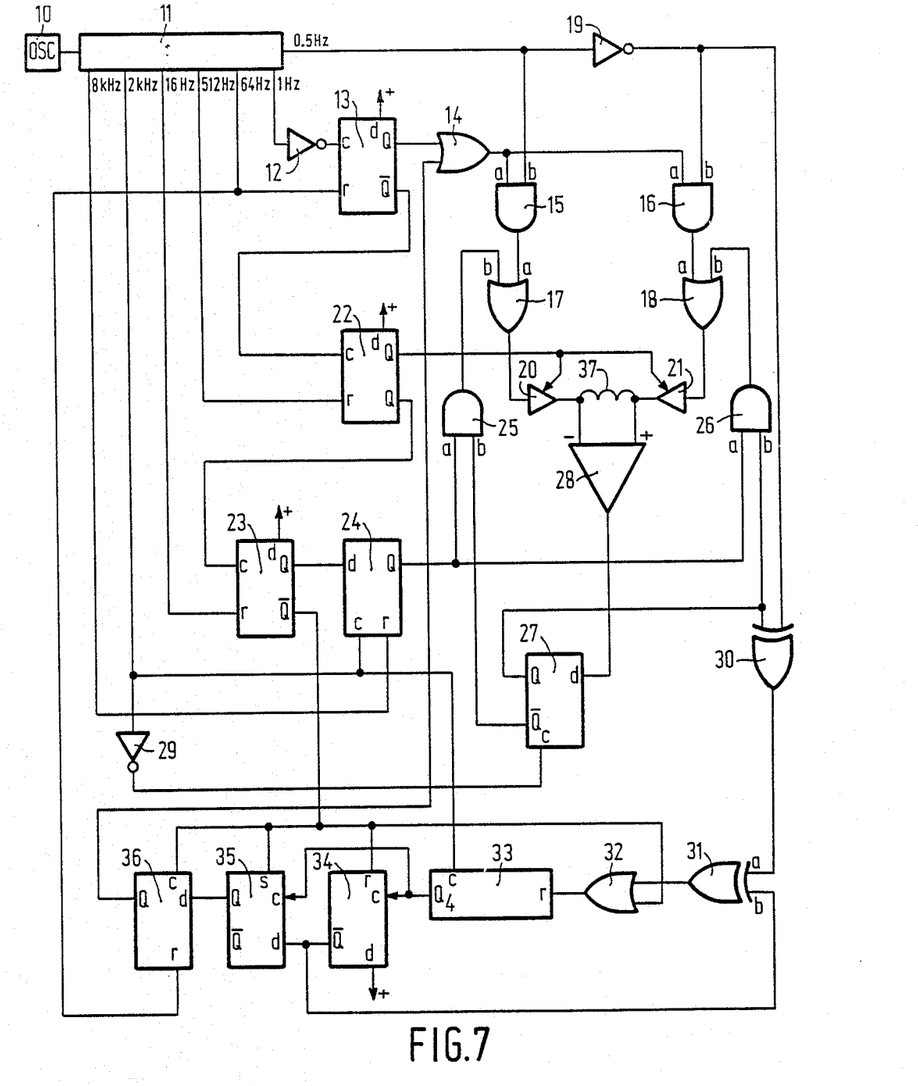
FIG. 7 shows an embodiment of the circuit shown in FIG. 1.

FIG. 7 shows a motor control circuit which is equipped with an induction-voltage detector in accordance with the invention. The circuit comprises an oscillator 10 and a frequency divider 11 which supplies signals of the frequencies 8 kHz, 2 kHz, 512 Hz, 64 Hz, 16 Hz, 1 Hz and 0.5 Hz. Via an inverter 12 the 1-Hz output is connected to the clock input c of a flip-flop 13 whose input d is "1" and whose reset input r is connected to the 64-Hz output of the divider. As a result of this, the flip-flop 13 produces a 7.8 ms pulse at its Q-output every second. This Q-output is connected to an input of an OR-gate 14 whose output is connected to the inputs a of the AND-gates 15 and 16. The outputs of AND-gates 15 and 16 are connected to inputs a of OR-gates 17 and 18. Input b of gate 15 is connected to the 0.5-Hz output of the divider 11, which output is connected to the input b of gate 16 via an inverter 19. The outputs of gates 17 and 18 are connected to the terminals of the motor coil via power amplifiers 20 and 21, each having a so-called "three-state" output (high, low and floating). Consequently, the gates 17 and 18 transfer the output pulses of flip-flop 13 (7.8 msecs. every second) to the amplifiers 20 and 21 alternatively, so that for 7 msecs. of every second and motor coil receives a voltage pulse whose polarity changes every second.

At the end of each drive pulse (7.8 msecs.) the $\overline{Q}$ output of flip-flop 13 goes to 1. This output is connected to the clock input of a flip-flop 22, whose input d is connected to "1" and whose reset input is connected to the 512-Hz output of the divider 11. Thus, at the end of the 7.8 msec. drive pulse the flip-flop 22 supplies 1-msec. pulse. The Q-output of flip-flop 22 is connected to an enable input of amplifiers 20 and 21 so that during this 1 msec. the outputs of the amplifiers 20 and 21 will have a high impedance. This high impedance reduces the time constant L/R of the motor-coil circuit so that the current in the coil as a result of the drive pulse can rapidly decrease to zero. After this 1 msec. The Q-output of the flip-flop 22 goes to "0" again, so that amplifiers 20 and 21 return to the state in which the outputs have a low-impedance and are consequently conductive. Thus, amplifiers 20 and 21 are disabled for a 1 msec period after each drive pulse, i.e. from 7.8 msec. to 8.8 msec. from the start of a drive pulse. The $\overline{Q}$-output, which then goes to "1", is connected to the clock input c of flip-flop 23, whose input d is connected to "1" and whose reset input r is connected to the 16-Hz output of the divider 11. The Q-output of flip-flop 23 consequently goes to "1" after said 1-msec. period. This is approximately 8.8 msecs. after the beginning of the drive pulse, and it goes to "0" again 31 msec. after the beginning of this drive pulse. The induction voltage is analysed during this period from 8.8 msecs. to 31 msecs. after the beginning of the drive pulse.

The Q-output of flip-flop 23 is connected to the input d of flip-flop 24, whose clock input is connected to the 2-kHz output of the divider and whose reset input r is connected to the 8-kHz output of the divider. This ensures that after the Q-output of flip-flop 23 has gone to "1" flip-flop 24 starts to generate pulses with a repetition rate of 2 kHz and a length of 61 μsec. Consequently, these pulses are "1" for ⅛ of their period and thereby define the previously mentioned parameter P=8.

The Q-output of flip-flop 24 is connected to the input a of AND-gates 25 and 26, whose outputs are connected to the inputs b of OR-gates 17 and 18 and whose inputs b are connected to the Q and $\overline{Q}$-outputs of a flip-flop 27, which has the same function as the flip-flop 7 in the circuit arrangement shown in FIG. 1. The input d of flip-flop 27 is connected to an output of a voltage-comparator circuit 28, those inputs are connected to the terminals of a motor coil 37. Although the internal resistance R of the motor coil is negligible, the polarity of the current through the coil can be measured if the internal resistance of the outputs of amplifiers 20 and 21 is sufficiently high.

The clock input of flip-flop 27 is connected to the output of the inverter 29, whose input is connected to the 2-kHz output of the divider 11. Depending on the state of flip-flop 27 the pulses supplied by the flip-flop 24 will appear on the output of amplifier 20 via gates 17 and 25 or on the output of the amplifier 21 via gates 18 and 26. In the period from 8.8 msec. to 31 msec. from the start of a drive pulse, the current in motor coil 37 is controlled by the loop 17, 20, 28, 27 and 25 or the loop including elements 18, 21, 28, 27 and 26. During this period the induction voltage in motor coil 37 is analyzed by analyzing the output signal of flip-flop 27.

Thus, the motor receives 2-kHz pulses of a polarity such that the current through the coil tends to become zero.

After 31 msecs. the rotor is in principle stabilized. It is then no longer necessary to analyse the voltage. The flip-flop 23 then goes to zero again, thereby inhibiting the generation of pulses by flip-flop 24.

Figure 8:
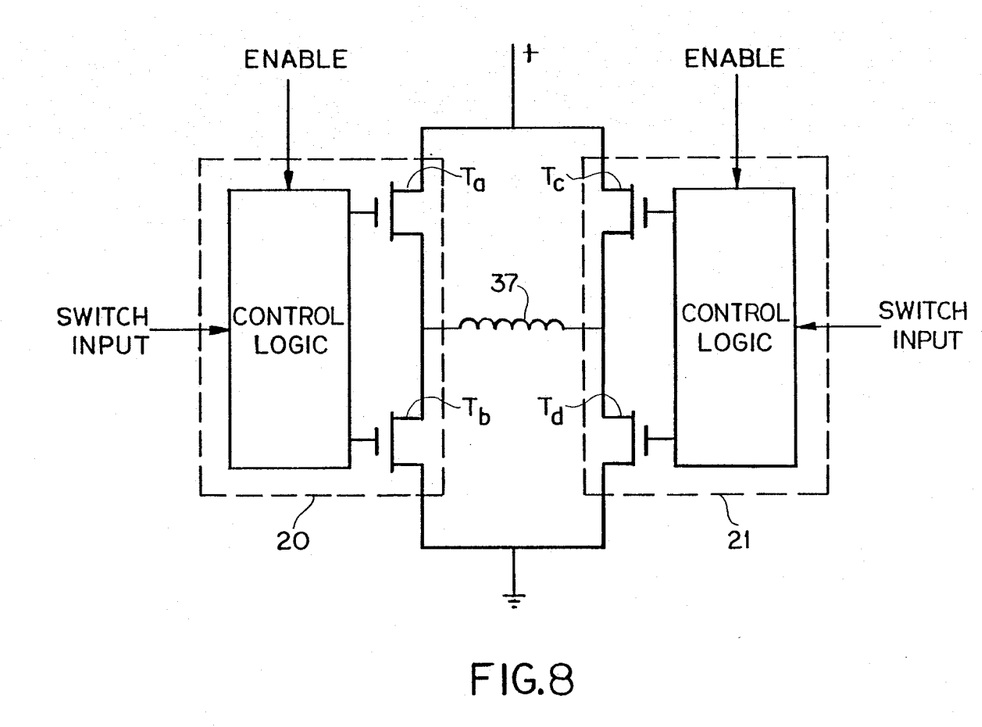
FIG. 8 is a schematic of the three-state output amplifiers.

FIG. 8 schematically shows the three-state output amplifiers 20 and 21 each of which includes a conventional control logic and an output circuit consisting of two power transistors, $T_A$ and $T_B$ for amplifier 20 and $T_C$ and $T_D$ for amplifier 21, connected in series between the positive (+) and negative (−) terminals of a power supply. The junction of the two power transistors $T_A$ and $T_B$ is connected to one end of the motor coil 37 and the junction of power transistors $T_C$ and $T_D$ is connected to the other end of motor coil 37.

The "enable" inputs to amplifiers 20 and 21 are each connected to the Q output of flip-flop 22 (FIG. 7). The "switch" input to amplifier 20 is connected to the output of OR gate 17 (FIG. 7) and the "switch" input to amplifier 21 is connected to the output of OR gate 18 (FIG. 7). The following table illustrates the relation between the impedance states of the transistors $T_A$ and $T_B$, the "enable" input and the "switch" input for the amplifier 20. The operation of amplifier 21 is the same as that of amplifier 20.

TABLE

| Enable | Switch | Impedance $T_A$ | Impedance $T_B$ |
|---|---|---|---|
| 0 | 1 | $R_{on}$ | $R_{off}$ |
| 0 | 0 | $R_{off}$ | $R_{on}$ |
| 1 | 1 | $R_{off}$ | $R_{off}$ |
| 1 | 0 | $R_{off}$ | $R_{off}$ |

The transistors are switched to a high impedance state (impedance=$R_{off}$) and to a low impedance state (impedance=$R_{on}$) by means of the control logic as a function of the signals at the "switch" and "enable" inputs. In operation, $R_{off} > > R_{on}$.

From the Table it can be seen that amplifier 20 can be controlled into three different states, i.e. a first low impedance state (enable input=0, switch input=1) in which the impedance of $T_A$ is low ($R_{on}$) and the impedance of $T_B$ is high ($R_{off}$). In this case the output of amplifier 20 is connected to the "+" terminal of the power supply via the conductive transistor $T_A$.

A second low impedance state is provided in which the impedance of transistor $T_A$ is high ($R_{off}$) and the impedance of $T_A$ is low ($R_{on}$) so that the output is connected to the ground terminal via the conductive transistor $T_B$. In this state the enable input of amplifier 20 is "0" and the switch input is "0". The output resistance of the amplifier in the first or second low impedance state is equal to the internal resistance of the conducting transistor.

The third, or high-impedance state occurs when the impedances of $T_A$ and $T_B$ are both high ($R_{off}$) so that the output impedance of the amplifier is high. In this state the enable input is a "1".

At the end of each drive pulse the flip-flop 22 supplies a 1 msec. pulse to the "enable" input of the amplifiers 20 and 21. Thus, all of the transistors $T_A$, $T_B$, $T_C$ and $T_D$ assume the "high" impedance state for 1 msec., resulting in a reduction of the L/R time constant of the motor coil circuit so that the current rapidly decreases to zero. The Q output of flip-flop 23 goes to "1" after said 1 msec. pulse (i.e. approximately 8.8 msec., after the beginning of the drive pulse). The Q output of flip-flop 23 goes to "0" again 31 msec. after the beginning of the drive pulse.

During the period of 8.8 msec. to 31 msec. the induction voltage is analyzed by periodically detecting the polarity of the induced motor current and by analyzing the pattern of the detected polarities. The detection moments occur when the output of flip-flop 24 is "0". In that case the output of AND gates 25 and 26 are zero too. Since the "a" inputs of OR gates 17 and 18 are "0" during the period from 8.8 msec. to 31 msec., the outputs of the gates 17 and 18 are "0" too, resulting in the second low impedance state of amplifiers 20 and 21. This means that transistors $T_B$ and $T_D$ simultaneously assume the low impedance state so that the outputs of the amplifiers 20 and 21 are connected to the ground terminal via transistors $T_B$ and $T_D$, respectively.

The current $I_m$ induced in the motor flows via the transistors $T_B$ and $T_D$ from one terminal of the motor coil to the other terminal of the coil. The voltage across the motor coil is equal to $I_m (2R_{on})$ and the polarity of the voltage detected by comparator 28 (FIG. 7) indicates the polarity of the motor current $I_m$. The result of the detection is stored in flip-flop 27. The polarity of the voltage pulses supplied to the motors depends on the output of flip-flop 27.

In summary, when a pair of transistors, e.g. $T_B$ and $T_D$, are conductive, the internal resistances of these transistors are connected in series across the terminals of the motor coil 37. In that case the polarity of the voltage developed across these resistances provides an indication of the polarity of the motor current at the detection instants.

During the 7.8 msec. drive pulses, one of the switch input signals (generated by OR gates 17 and 18) is "0", while the other one of the switch input signals is a "1". One of the outputs of amplifiers 20 and 21 is then connected to the "+" terminal, while the output of the other amplifier is connected to the ground terminal, resulting in a 7.8 msec. voltage pulse across the motor coil.

For the analysis of the induction voltage $U_i$ the output signal of flip-flop 27 is analysed. This output signal is applied to one input of an exclusive-OR-gate 30 whose other input is connected to the output of inverter 19 on which the 0.5-Hz pulses appear. This gate 30 inverts the output signal of flip-flop 27 for half of every two seconds, which is necessary because the polarity of the induction voltage is inverted every second as a result of the polarity reversal of the drive pulse every second.

The output signal of gate 30 is applied to input a of an exclusive OR-gate 31 whose output is connected to the input of an OR-gate 32. The output of gate 32 is connected to the reset input of a scale-of-4 counter 33. The second input of gate 32 is connected to the $\overline{Q}$-output of flip-flop 23 and to the reset input r of a flip-flop 34, the set input S of a flip-flop 35, and the clock input c of a flip-flop 36. The clock input c of the counter 33 is connected to the 2-kHz output of the divider 11 and output Q4 of the counter is connected to the clock inputs c of the flip-flops 34 and 35. The $\overline{Q}$-output of flip-flop 34 is connected to input d of flip-flop 35 and input b of gate 31, and the Q-output of flip-flop 35 is connected to the input d of flip-flop 36. The reset input r of flip-flop 36 is connected to the 64-Hz output of the divider 11 and the Q-output of this flip-flop 36 is connected to a second input of the OR-gate 14.

The circuit operates as follows: At the beginning of the analysis the output of the counter 33 is "0", the $\overline{Q}$ output of flip-flop 34 is "1", the Q-output of flip-flop 35 is "1", and the Q-output of flip-flop 36 is "0". When the output of gate 30 is "1" the outputs of gates 31 and 32 are "0" and counter 33 can count because its rest input r is "0". However, if the output of gate 30 is "0", the outputs of gates 31 and 32 are "1" and counter 33 is reset to "0" and maintained at "0". In order to ensure that output Q4 of the counter 33 goes to "1", it is therefore necessary that the output of gate 30 remains a "1" for at least four consecutive periods, which corresponds to the interval P1 in FIGS. 2 to 6.

When output Q4 of counter 33 goes to "1" the $\overline{Q}$-output of flip-flop 34 goes to "0", and the Q-output of flip-flop 35 remains at "1". As a result of this, input b of gate 31 goes to "0" and the aforementioned process is reversed, i.e. the counter 33 counts when the output of gate 30 is at "0", and the counter is always reset when the output of gate 30 is at "1". In order to ensure that output Q4 of the counter 33 returns to "1", it is necessary that the output of gate 30 remains at "0" for at least four consecutive periods, which corresponds to the periods P2 in FIGS. 2 to 6. When output Q4 goes to "1" for the second time the output of flip-flop 35 goes to "0" because its input d has gone to "0". In this way the desired operation is obtained. Firstly, a period P1 (FIGS. 2-6) has to be detected, which is represented by the $\overline{Q}$-output of the flip-flop 34 going to "0". Subsequently a period P2 (FIGS. 2-6) is detected, which is represented by the Q-output of flip-flop 35 going to "0", which output does not go to "0" if the period P1 has not been detected.

If only the period P1 or neither the period P1 not the period P2 has been detected, the Q-output of flip-flop 35 remains at "1". As a result of this, the output of flip-flop 36 goes to "1" after 31 msecs because the $\overline{Q}$ output of flip-flop 23 then goes to 1. As flip-flop 36 is reset by the 64-Hz signal the Q-output of flip-flop 36 remains at "1" for approximately 8 msecs. Thus, if the requirements are not met, which corresponds to the situation in which the motor has not made a step, flip-flop 36 generates a new 8 msec. pulse 31 msecs. after the beginning of the drive pulse, which new pulse is applied to the motor via gate 14, gate 15 or 16, gate 17 or 18, and the amplifier 20 or 21 in order to ensure that a step is even now actually made.

Thus, in the manner described, a simple circuit arrangement consisting almost completely of logic elements is obtained for generating an additional pulse when the original drive pulse has not led to a step of the stepping motor.

The invention is not limited to the embodiment shown. For example, the described analysis of the induction voltage may be used for adapting the energy of the drive pulse to the motor load.

Furthermore, the criterion described in the foregoing may also be used for detecting whether the motor has made a step in the case of, for example, an analogue circuit which compares the induction voltage directly with a reference level instead of using the described method for analysing the induction voltage.

What is claimed is:

1. A method of analysing the voltage induced in an exciter coil of a stepping motor in detection periods which occur after energization of the exciter coil, said method comprising: energizing the exciter coil with a drive pulse for a given period, defining detection periods after the energizing periods, loading the exciter coil in said detection periods with an impedance so that an induction voltage developed can produce an induction current, detecting the polarity of the current in the exciter coil at periodic instants during said detection period, energizing the exciter coil in accordance with the detected polarity with a voltage of a polarity such that the instantaneous current in the exciter coil is counteracted, and analyzing the polarity pattern of consecutive energizations during said detection periods to provide an indication of the motor response to the drive pulses.

2. A method as claimed in claim 1, wherein during the detection periods, the exciter coil is energized with a periodic pattern of voltage pulses of constant duration whose polarity is controlled as a function of the detected polarity of the current in the exciter coil.

3. A method as claimed in claim 2, including the step of detecting the ratio of the number of voltage pulses of one polarity to the number of voltage pulses of the other polarity over a specific period.

4. A method as claimed in claim 3, characterized in that the voltage pulses have a fixed duration which is a fraction of the length of the period at which they recur.

5. A method as claimed in claim 4, including the step of detecting whether a series of more than a predetermined number of consecutive pulses of the same polarity occur.

6. A method as claimed in claim 5, including the step of detecting whether a second series of at least a first predetermined number of consecutive pulses, of a polarity which, relative to the exciter coil is opposite to the polarity of the voltage across the exciter coil during energization, occurs after a first series of at least a second predetermined number of consecutive pulses of an opposite polarity has occurred.

7. A method as claimed in claim 1 characterized by analyzing the pattern of consecutive energizations during said detection period so as to detect whether the induction voltage has been more negative than a predetermined level for at least a second period of a predetermined first duration after said induction voltage has been more positive than a predetermined level for at least a first period of a predetermined second duration.

8. A method as claimed in claim 6, characterized by terminating each detection period at least a predetermined time interval after the detection of the first series of pulses.

9. A method as claimed in claim 7, characterized by terminating each detection period at least a predetermined time interval after the detection of the first period.

10. A circuit for analyzing the voltage induced in an exciter coil of a stepping motor comprising, a comparator for determining the polarity of a current in the exciter coil of the stepping motor, a control-signal generator for generating a signal in conformity with the detected polarity of said current, a commutation circuit for connecting the exciter coil of the stepping motor to a voltage source under command of said signal such that the polarity of the resulting current variation in the exciter coil is opposite to the polarity determined by the comparator, and a logic-gate circuit for analysing the consecutive polarities of said current variations.

11. A circuit as claimed in claim 10, wherein the logic gate circuit receives said signal from the control signal generator as an input signal.

12. A circuit as claimed in claim 10, the logic-gate circuit comprises counting means for detecting whether at least a first number of consecutive signals corresponding to a first polarity of said current, which first polarity is opposite to the polarity of the current in a exciter coil during the preceding drive period, occurs after a second number of consecutive signals, corresponding to a second polarity opposite to the first plurality, has occurred.

13. A method of analysing a voltage induced in an exciter coil of a stepping motor in detection periods which occur after energization periods of the motor, comprising: energizing the motor with a drive pulse during an energization period, subsequently detecting in a detection period whether the induction voltage has been more negative than a predetermined level for at least a second period of predetermined duration after said induction voltage has been more positive than a predetermined level for at least a first period of predetermined duration thereby to determine whether the motor made a step as a result of the drive pulse.

14. A method as claimed in claim 13, including the step of each detection period is terminated a predetermined time interval after the detection of the first period.

15. A method as claimed in claim 13 further comprising, in said detection periods, loading the exciter coil by an impedance so that the induction voltage can produce an induction current, detecting the polarity of the current in the exciter coil at periodic instants during said detection periods, and in accordance with the detected polarity energizing the exciter coil with a voltage of a polarity such that the instantaneous current in the exciter coil is counteracted, and analyzing the pattern of consecutive energizations during said detection periods.

16. A method as claimed in claim 15, characterized in that during the detection periods, the exciter coil is energized with a periodic pattern of voltage pulses of constant duration whose polarity is controlled as a function of the detected polarity of the current in the exciter coil.

17. A method as claimed in claim 16, including the step of determining the ratio of the number of voltage pulses of one polarity to the number of voltage pulses of the other polarity over a specific period.

18. A method as claimed in claim 17, characterized in that the voltage pulses have a fixed duration which is a fraction of the length of the period at which they recur.

19. A method as claimed in claim 18, including detecting whether a series of more than a predetermined number of consecutive pulses of the same polarity occur.

20. A method as claimed in claim 19, including the step of detecting whether a second series of at least a first predetermined number of consecutive pulses of a polarity which, relative to the exciter coil, is opposite to the polarity of the voltage across the exciter coil during the energization period, occurs after a first series of at least a second predetermined number of consecutive pulses of a polarity opposite to the first-mentioned polarity has occurred.

21. A circuit for analyzing a voltage induced in an exciter coil of a stepping motor in detection periods which occur after an energization period, which circuit comprises, comparison means for comparing the induced voltage (induction voltage) with the voltage of a voltage source, and a detection circuit for detecting whether the induction voltage has been more negative than a predetermined voltage level for at least a second period of predetermined duration after said induction voltage has been more positive than a predetermined voltage level for at least a first period of predetermined duration.

22. A circuit as claimed in claim 21, characterized in that the comparison means comprise a comparator for determining the polarity of a current in the exciter coil of the stepping motor, a control-signal generator for generating a signal in conformity with the detected polarity of said current, a commutation circuit for connecting the exciter coil of the stepping motor to the voltage source under command of said signal, in such a way that the polarity of the resulting current variation in a exciter coil is opposite to the polarity determined by the comparator, and the detection circuit is a logic gate circuit for analysing the consecutive polarities of said current variations.

23. A circuit as claimed in claim 22, characterized in that the logic-gate circuit receives said signal as an input signal.

24. A circuit as claimed in claim 22, characterized in that the logic-gate circuit comprises counting means for detecting whether at least a first number of consecutive signals corresponding to a first polarity of said current, which first polarity is opposite to the polarity of the current in the exciter coil during a preceding drive, occurs after a second number of consecutive signals has occurred corresponding to a second polarity opposite to the first polarity.

25. A circuit as claimed in claim 23 wherein the logic gate circuit comprises counting means for detecting whether a first number of consecutive signals corresponding to a first polarity of said current, which first polarity is opposite to the polarity of the current in the exciter coil during a preceding drive period, occurs after a second number of consecutive signals, corresponding to a second polarity opposite to the first polarity, has occurred.

26. A method as claimed in claim 2 wherein the pattern of consecutive energizations during said detection period is analyzed by detecting whether the induction voltage has been more negative than a predetermined level for at least a second period of a predetermined first duration after said induction voltage has been more positive than a predetermined level for at least a first period of a predetermined second duration.

27. A method as claimed in claim 26 characterized by terminating each detection period at least a predetermined time interval after the detection of the first period.

28. A method as claimed in claim 14 further comprising, loading the exciter coil with an impedance during said detection periods so that the induction voltage can produce an induction current, detecting the polarity of the current in the exciter coil at periodic instants during said detection periods, energizing the exciter coil in accordance with the detected polarity with a voltage of a polarity such that the instantaneous current in the exciter coil is counteracted, and analyzing the pattern of consecutive energizations during said detection periods.

29. A method as claimed in claim 28 further comprising energizing the exciter coil during the detection periods with a periodic pattern of voltage pulses of constant duration whose polarity is controlled as a function of the detected polarity of the current in the exciter coil.

30. A method as claimed in claim 29 including the step of determining the ratio of the number of voltage pulses of one polarity to the number of voltage pulses of the other polarity over a specific period.

31. A method as claimed in claim 30 including the step of detecting whether a series of more than a predetermined number of consecutive pulses of the same polarity occur.

32. Apparatus for controlling the operation of a stepping motor by analyzing the voltage induced in an exciter coil of the motor comprising: amplifier means for applying step drive pulses to the motor exciter coil during recurrent motor energization periods, a commutation circuit for coupling said amplifier means to said exciter coil during detection periods that follow the energization periods so that an induction voltage is induced in the exciter coil and produces an induction current in said coil, a comparator coupled to the exciter coil for determining the polarity of the currents therein during the detection periods, means controlled by the comparator for generating a signal having a pattern of consecutive polarities determined by the polarities of the induction currents, the commutation circuit being responsive to signal signal for selectively connecting the motor exciter coil to a source of voltage so as to supply a current to said exciter coil of a polarity that opposes the induction current, and a logic-gate circuit controlled by said signal for analyzing the pattern of consecutive polarities of said signal during said detection periods thereby to derive an indication of motor operating characteristics.

33. Apparatus as claimed in claim 32 wherein said signal generating means comprises a bistable device having an input coupled to an output of the comparator and an output coupled to the commutation circuit.

34. Apparatus as claimed in claim 32 wherein the amplifier means includes first and second amplifiers each having an output impedance and the commutation circuit selectively connects the motor exciter coil to said voltage source via said first and second amplifiers.

35. A method of operating step motor comprising: energizing an exciter coil of the motor with drive pulses during recurrent motor energization periods, loading the exciter coil with a low impedance during detection periods that follow the energization periods so that induction voltages are developed that produce induction currents in said exciter coil, detecting the polarity of said induction currents during the detection periods, supplying said exciter coil with positive or negative energizing voltages determined by the detected polarities of the induction currents so as to attempt to maintain the coil current equal to zero, and analyzing the polarity pattern of said energizing voltages to determine the motor response to the drive pulses.

36. A circuit for analyzing a voltage induced in an exciter coil of a stepping motor in detection periods which occur after an energization period, said circuit comprising: a comparator for determining the polarity of a current in the exciter coil of the stepping motor, a control signal generator for generating a logic control signal in conformity with the determined polarity of said current, a commutation circuit for connecting the exciter coil of the stepping motor to a voltage source under command of said control signal such that the polarity of a resulting current variation in the exciter coil is opposite to the polarity determined by the comparator, and a logic gate circuit for detecting whether the control signal had a first logic value for at least a second period of predetermined duration after said control signal had a second logic value for at least a first period of predetermined duration thereby to provide an indication as to whether or not the motor missed a step.

* * * * *